(12) United States Patent
Olivier

(10) Patent No.: US 9,382,917 B2
(45) Date of Patent: Jul. 5, 2016

(54) FIBROUS STRUCTURE FORMING A FLANGE AND A COUNTER-FLANGE

(75) Inventor: Loic Olivier, Alfortiville (FR)

(73) Assignee: SNECMA, Paris (FR)

( * ) Notice: Subject to any disclaimer, the term of this patent is extended or adjusted under 35 U.S.C. 154(b) by 865 days.

(21) Appl. No.: 13/701,910

(22) PCT Filed: May 27, 2011

(86) PCT No.: PCT/FR2011/051216
§ 371 (c)(1),
(2), (4) Date: Feb. 14, 2013

(87) PCT Pub. No.: WO2011/151578
PCT Pub. Date: Dec. 8, 2011

(65) Prior Publication Data
US 2013/0136588 A1 May 30, 2013

(30) Foreign Application Priority Data

Jun. 4, 2010 (FR) ..................................... 10 54394

(51) Int. Cl.
*F04D 29/54* (2006.01)
*B29B 11/16* (2006.01)
*B29C 70/22* (2006.01)

(52) U.S. Cl.
CPC ............. *F04D 29/54* (2013.01); *B29B 11/16* (2013.01); *B29C 70/222* (2013.01); *Y10T 428/1362* (2015.01); *Y10T 428/24488* (2015.01)

(58) Field of Classification Search
CPC ....... F04D 29/54; B29B 11/16; B29C 70/222; Y10T 428/1362; Y10T 428/24488
See application file for complete search history.

(56) References Cited

U.S. PATENT DOCUMENTS

| 3,920,049 A | * | 11/1975 | Lippert | B29C 57/00 138/109 |
| 4,065,339 A | | 12/1977 | Lippert et al. | |
| 4,900,072 A | | 2/1990 | Bordner | |

FOREIGN PATENT DOCUMENTS

| CN | 1916477 A | 2/2007 | |
| FR | 2970897 A1 * | 8/2012 | ............. B29B 11/16 |
| JP | 48 79887 A | 10/1973 | |

OTHER PUBLICATIONS

Chinese Office Action issued Aug. 26, 2014 in Patent Application No. 2011800277220 (submitting English language translation only).
International Search Report Issued Aug. 12, 2011 in PCT/FR11/51216 Filed May 27, 2011.

(Continued)

*Primary Examiner* — Igor Kershteyn
(74) *Attorney, Agent, or Firm* — Oblon, McClelland, Maier & Neustadt, L.L.P.

(57) ABSTRACT

A fibrous structure for fabricating a composite part including a matrix reinforced by the fibrous structure, the fibrous structure being made by three-dimensional weaving and presenting a main portion and a margin adjacent to the main portion. The margin presents a thickness greater than the thickness of the main portion and the margin includes a first portion arranged in continuity with the main portion and a second portion superposed on the first portion to constitute extra thickness, the margin thus being configured to be folded towards the second portion so that the first and second portions respectively form a flange and a counter-flange for fastening the part.

13 Claims, 2 Drawing Sheets

(56) References Cited

OTHER PUBLICATIONS

Office Action issued Apr. 21, 2015 in Japanese Patent Application No. 2013-512973 (submitting English language translation only).
Office Action issued Mar. 26, 2015 in Chinese Patent Application No. 201180027722.0 (submitting English language translation only).

Liu Shuang, et al.,"Application 3D Braiding/RTM Composites to Cylinder with Flange" Fourteenth National Conference on Composite Materials, Harbin Institute of Technology and the Institute of Composite Materials; China Aerospace Science and Industry Corporation VI Institute forty-one, 2006, pp. 412-416.

* cited by examiner

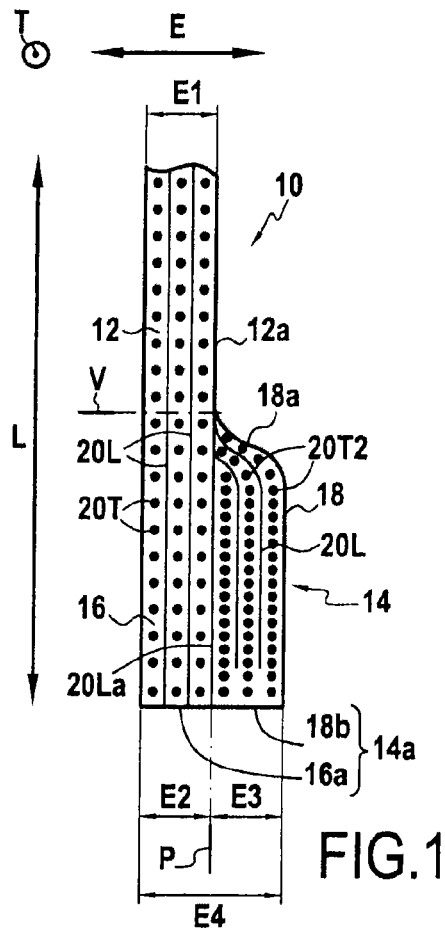
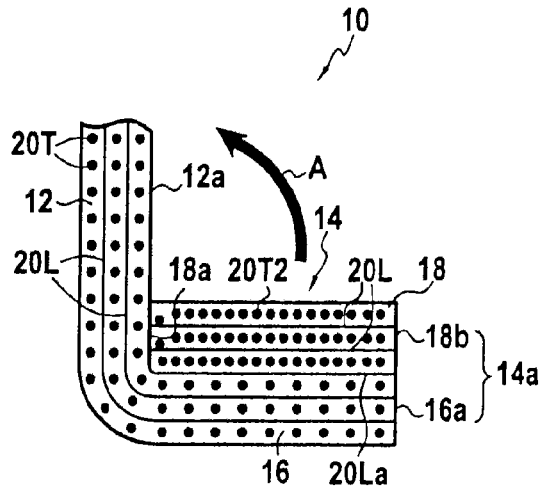
FIG.2
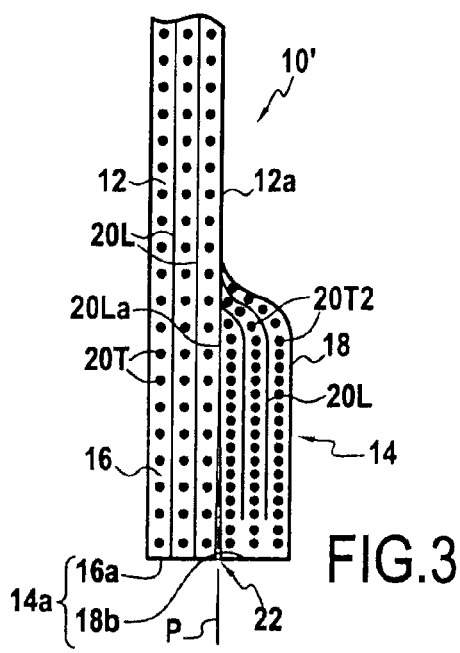
FIG.1
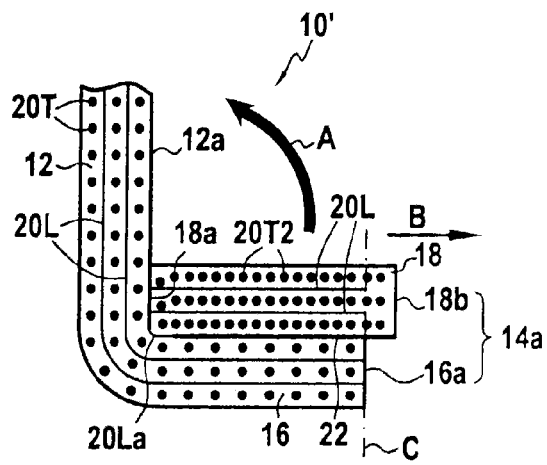
FIG.4
FIG.3

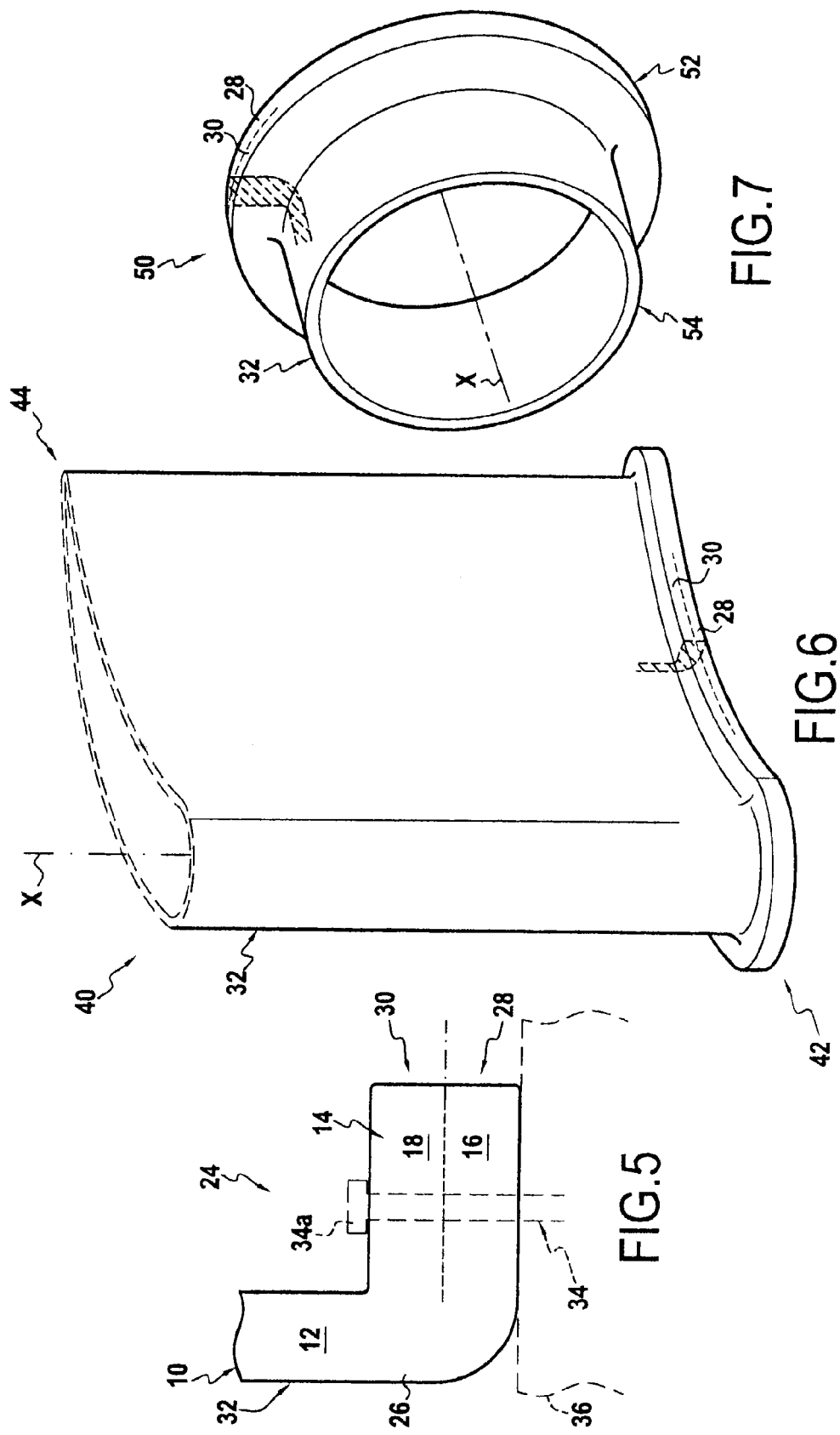

FIBROUS STRUCTURE FORMING A FLANGE AND A COUNTER-FLANGE

FIELD OF THE INVENTION

The present invention relates to a fibrous structure, generally referred to as a preform, for use in fabricating a composite part that has a flange and a counter-flange, both the flange and the counter-flange being made from the fibrous structure. In particular, the invention relates to a fibrous structure for fabricating a part for a turbine engine or a turbojet.

BACKGROUND OF THE INVENTION

In conventional mechanical structures, parts are often connected together using flanges and counter-flanges. As a general rule, a flange is a portion extending at an angle from the end of a part along all or part of its circumference, and used for joining said part to another part by bolting, the bolts passing through the flange. A counter-flange is a reinforcing part that presents the same general shape as the flange and that is disposed between the heads of the bolts and the flange. The function of the counter-flange is to distribute the forces that hold the part over the entire flange. Without a counter-flange, those forces would be concentrated on the flange in the vicinity of the heads of the bolts, thereby weakening the flange. In order to perform its function correctly, the counter-flange must be a good fit to the surface of the flange.

When the part is made of composite material (such a part generally being referred to as a "composite part"), the flange forming a portion of the part is likewise made out of the same composite material. The counter-flange is generally made out of a different material. More recent composite parts are made from a fibrous structure that has been three-dimensionally woven using fibers (of carbon, kevlar, glass, etc.) and densified with a polymer. Thus, in a composite part, the fibrous structure is embedded within a solid polymer matrix, which matrix is reinforced by the fibrous structure.

By way of example, one known technique for performing such densification is impregnation using a liquid: a distinction is drawn between infusion and injection, and both of those techniques are described elsewhere.

Thus, starting with a composite part fabricated using the above techniques, in order to ensure that the flange and the counter-flange fit together well, various solutions are possible.

The solution that consists in machining the regions of the flange that come into contact with the counter-flange so that the flange is a good fit with the surface of the counter-flange cannot be accepted since such machining would cut the fibers of the fibrous structure, thereby compromising the mechanical integrity of the flange, since it is the fibers that provide its mechanical strength.

The solution that has been used in the past consists in fabricating a counter-flange out of metal, e.g. titanium, that is a good fit with the surface of the composite flange, the flanges and the counter-flanges being fabricated as separate series. It should be observed that each composite part is unique and, in particular, it presents an outside surface that often differs from other parts fabricated using the same mold and the same technique. These variations from one composite part to another run the risk of creating contact defects between the flange and the counter-flange, and consequently of giving rise to subsequent damage. In addition, potential point contacts between the fibers of the flange and the metal counter-flange run the risk of giving rise to subsequent damage. Similarly, any residual zones forming pockets of resin between the flange and the counter-flange also run the risk of giving rise to subsequent damage. Furthermore, metal is a material that is heavy compared with composite materials, having about three times the density, thereby also presenting a drawback in the context of optimizing the weight of turbojets and turbine engines.

OBJECT AND SUMMARY OF THE INVENTION

The object of the present invention is substantially to remedy the above-specified drawbacks.

The invention achieves this object by providing a fibrous structure for fabricating a composite part comprising a matrix reinforced by said fibrous structure, said fibrous structure being made by three-dimensional weaving and presenting a main portion and a margin adjacent to the main portion, wherein said margin presents a thickness greater than the thickness of the main portion and wherein the margin comprises a first portion arranged in continuity with the main portion and a second portion superposed on the first portion, said margin thus being configured for being folded towards the second portion so that said first and second portions respectively form a flange and a counter-flange for fastening said part.

It can be understood that when the composite part is fabricated using a fibrous structure, the main portion of the fibrous structure forms the body of the composite part, while the margin forms an assembly comprising a flange and a counter-flange and that forms an integral portion of the composite part. The flange is made from the first portion while the counter-flange is made from the second portion. The second portion is superposed on the first portion and therefore provides extra thickness.

Folding the margin of the fibrous structure serves to provide a bent portion between the flange and the body of the composite part. When the margin extends the main portion, the second portion placed on the first portion projects from one of the planes defining the thickness of the main portion. It can thus be understood that the first portion of the margin presents thickness that is less than or equal to the thickness of the main portion, while the thickness of the second portion is such that the thickness of the margin corresponding to the sum of the thicknesses of the first and second portions is greater than the thickness of the main portion. Thus, before the margin has been folded, i.e. when the margin still extends the main portion, the second portion forms a shoulder.

It should be observed that using the term "in continuity" should be understood as meaning that a portion runs on from another portion, but that these two portions do not necessarily lie in the same plane. The term "extending" is used to mean that a portion runs on from another portion and both portions lie in the same plane.

Thus, by folding the margin towards the second portion, i.e. by bringing the second portion of the margin towards the main portion, the fibrous structure is given the final shape of the assembly comprising the flange and the counter-flange relative to the body of the part. During this folding, it can be understood that the shoulder formed by the second portion is moved towards the main portion. Advantageously, this shoulder comes into contact with the main portion.

It can also be understood that the first and second portions form a single entity directly connected to the main portion. Likewise, once the composite part has been fabricated, the flange and the counter-flange form a single entity, this entity being joined directly to the body of the composite part and being in continuity therewith.

Thus, by means of the fibrous structure of the invention, the counter-flange is fabricated and positioned directly relative to the flange during fabrication of the composite part. Consequently, there is no longer any need for the operations of fitting and machining the counter-flange that are to be encountered in the prior art. This achieves a saving in time during fabrication of the composite part and the counter-flange. This also achieves a significant cost saving since there is no longer any need to provide a counter-flange that is distinct from the composite part, nor is there any need to machine the counter-flange. Furthermore, assembling the composite part in its context, e.g. within a turbine engine, is made easier since there is no longer any need to put into place a counter-flange that is distinct from the composite part.

Finally, a weight saving is obtained by making the counter-flange out of composite material. The composite materials that are generally used present density that is less than that of titanium and a Young's modulus that is comparable, where titanium is the material in which prior art counter-flanges have been made, such that for comparable size, a composite material counter-flange is lighter in weight while presenting mechanical characteristics that are comparable, in particular from a stiffness point of view. It can be understood that by means of the fibrous structure of the invention it is possible to fabricate a composite part that is suitable for replacing a part that has been fabricated using the techniques of the prior art, and in which the flange and counter-flange assemblies present the same thickness and the same mechanical characteristics. For example, the fibrous structure may be made from carbon fibers and the resin may be an epoxy resin.

Advantageously, the margin presents a free end, the first portion being partially disjoint from the second portion beside the free end of the margin.

It can thus be understood that the margin presents a free end, the free end being located relative to the margin opposite from the side where the margin is connected to the main portion. Thus, the main portion is disjoint from the second portion beside the free end of the margin, while the first portion and the second portion are united at the junction between the margin and the main portion. Preferably, the first portion and the second portion are disjoint along a plane that is substantially parallel to one of the planes defining the thickness of the margin. Advantageously, the first portion and the second portion are disjoint over a length of about 80% of the distance between the free end of the margin and the side of the margin that is connected to the main portion.

During folding of the margin, this partial disjunction (or separation) makes it possible for the first portion to slide tangentially relative to the second portion, thereby facilitating the folding operation. In addition, since folding is easier, the fibrous structure forms few or no irregularities in the corners of the folds. These irregularities that need to be avoided may for example be constituted by wrinkles where the fibers have been pressed against one another, and/or by fibers being splayed apart where the fibers have been subjected to traction forces. Thus, by separating the first and second portions in part, the regularity of weaving within the fibrous structure is improved, and in particular in the corners of the fold, once the margin has been folded, such that the mechanical characteristics of the flange and of the counter-flange in the finished composite part are improved.

It can thus be understood that the first portion is partially disjoint from the second portion in the fibrous structure, whereas once the part has been fabricated, the flange and the counter-flange form a single entity that is completely united within a polymer matrix.

Advantageously, the thickness of the first portion is different from the thickness of the second portion.

This makes it possible to adjust the thicknesses of each of the portions as a function of the desired mechanical characteristics.

Advantageously, the second portion presents warp fibers that are shorter than the warp fibers of the first portion.

The warp fibers are the fibers that extend from the main portion towards the margin, i.e. substantially perpendicularly to the margin. The warp fibers are the fibers that present the greatest resistance to folding the margin. Thus, by shortening the warp fibers in the second portion, folding of the margin is made easier.

Preferably, the main portion extends in a longitudinal direction and in a transverse direction, the first portion extending in continuity with the main portion in the longitudinal direction, a majority of the fibers of the first portion being oriented in the longitudinal direction, while a majority of the fibers of the second portion are oriented in the transverse direction.

It can be understood that the longitudinal fibers are the warp fibers while the transverse fibers are the weft fibers. A "majority" means more than 50%.

The first portion that is to form the flange that serves to hold the composite part advantageously presents a majority of longitudinal fibers, i.e. fibers extending from the main portion towards the first portion. It can be understood that these longitudinal fibers are common both to the first portion and to the main portion. The retention of the composite part by the flange is ensured for the most part by these longitudinal fibers. Consequently, because of this majority of longitudinal fibers, the mechanical holding properties of the flange are improved.

The second portion that is to form the counter-flange performs a function of reinforcing the flange. In order to provide this function, the presence of transverse fibers is preferred. These transverse fibers extend over the entire transverse extent of the counter-flange, such that these transverse fibers confer mechanical strength and more particularly bending stiffness that is better than the strength and stiffness conferred by the longitudinal fibers. Furthermore, as explained above, the longitudinal fibers are fibers that provide the greatest resistance to folding the margin. Consequently, by providing the second portion with a majority of transverse fibers over longitudinal fibers, the mechanical strength of the counter-flange is improved without limiting the capacity of the margin to be folded.

The invention also provides a composite part comprising a matrix reinforced by a fibrous structure of the invention, said composite part presenting a fastener flange and a fastener counter-flange formed respectively by the first portion and by the second portion of said fibrous structure.

In an embodiment, the composite part forms a guide vane, the flange and the counter-flange being located in the vicinity of the root of said guide vane.

It should be observed that a guide vane, in particular an inlet or an outlet guide vane (IGV or OGV) of a turbojet or a turbine engine extends in an axial direction and that the vane root is located in the vicinity of one axial end of the vane. The vane is fastened to a vane support, generally a vane wheel, in the vicinity of the vane root.

In another embodiment, the composite part forms a cylindrical part of circular section, the cylindrical part extending along an axial direction, the flange and the counter-flange being annular and being located in the vicinity of an axial end of the cylindrical part. Advantageously, the cylindrical part forms a ferrule.

The invention also provides a method of fabricating a fibrous structure for fabricating a composite part comprising a matrix reinforced by said fibrous structure, wherein the fibrous structure is according to the invention and is made by three-dimensional weaving.

Advantageously, floats are added during the weaving of the fibrous structure in order to make the second portion.

It can be understood that the floats are additional fibers inserted during the weaving of the second portion.

Advantageously, a fraction of the second portion is unlinked from the first portion.

Preferably, during weaving, the fibers separate at least in part the warp planes of the first portion from the warp planes of the second portion.

The invention also provides a method of fabricating a composite part comprising a matrix reinforced by a fibrous structure, the method comprising the following steps: providing a fibrous structure of the invention; folding the margin of said fibrous structure to form an assembly comprising a flange and a counter-flange for fastening said part; and densifying said fibrous structure with a polymer, the fibers of said fibrous structure being embedded in a matrix formed by the polymer.

Advantageously, the free end of the margin is machined in such a manner that the free end of the first portion and the free end of the second portion lie in continuity one with the other.

BRIEF DESCRIPTION OF THE DRAWINGS

The invention and its advantages can be better understood on reading the following detailed description of various embodiments of the invention given as non-limiting examples. The description refers to the sheets of the accompanying drawings, in which:

FIG. 1 shows a first embodiment of the fibrous structure in a fragmentary cross-section view, the margin being arranged to extend the main portion;

FIG. 2 shows the first embodiment in fragmentary cross-section view, with the margin folded;

FIG. 3 shows a second embodiment of the fibrous structure in fragmentary cross-section view with the margin arranged to extend the main portion;

FIG. 4 shows the second embodiment in fragmentary cross-section view with the margin folded;

FIG. 5 shows a composite material part in fragmentary cross-section view as obtained using the fibrous structure of FIG. 2;

FIG. 6 shows a composite guide vane; and

FIG. 7 shows a composite ferrule.

MORE DETAILED DESCRIPTION

FIG. 1 shows a first embodiment of a fibrous structure 10 having a main portion 12 and a margin 14 adjacent to the main portion 12. The fibrous structure 10 is in fragmentary cross-section view with the margin 14 arranged to extend the main portion 12. In FIG. 1, arrow L designates the longitudinal direction, while arrow E represents the thickness direction. The transverse direction extends perpendicularly to FIG. 1 (i.e. perpendicularly both to the longitudinal direction and to the thickness direction) and it is represented by arrow T.

The margin 14 has a first portion 16 and a second portion 18 that are joined together. The plane P drawn in chain-dotted lines beyond the end face 12a of the main portion 12 marks the boundary between the first portion 16 and the second portion 18. It should be observed in this first embodiment that this boundary is symbolic. The second portion 18 projects from the main portion 12, and it forms a shoulder 18a. A plane V drawn in chain-dotted lines in the thickness direction E and arranged level with the shoulder 18a symbolizes the boundary between the main portion 12 and the first portion 16.

In this first embodiment, the main portion 12 has thickness E1, the first portion 16 has thickness E2 (in this example E1=E2), and the second portion 18 has thickness E3. Since the second portion 18 overlies the first portion 16 so as to form extra thickness, the margin 14 presents thickness E4 that is greater than the thickness E1 of the main portion 12, this thickness E4 being equal to the sum of the thicknesses of the first and second portions 16 and 18 (E4=E2+E3).

The longitudinal fibers 20L extend in the longitudinal direction L. The longitudinal fibers 20L of the first portion 14 are common, at least in part, with the longitudinal fibers 20L of the main portion 12. I.e., all or some of the longitudinal fibers 20L of the first portion 16 also extend in the main portion 12. The transverse fibers 20T and 20T2 extend in the transverse direction T. In the first portion 16, there are more longitudinal fibers 20L than transverse fibers 20T. Conversely, in the second portion 18 there are more transverse fibers 20T2 than longitudinal fibers 20L. It should be observed that this number of fibers of a first type (in particular longitudinal fibers 20L) that is greater or smaller relative to the number of fibers of a second type is not necessarily visible in the figures, which show the fibrous structure 10 diagrammatically in two dimensions. It is necessary to consider the fibrous structure 10 as a whole in three dimensions.

In addition, the longitudinal fibers 20L of the second portion 18 are shortened in the warp direction relative to the longitudinal fibers 20L of the first portion 16, and therefore, when the margin 14 is arranged to extend the first portion 12, they do not extend as far as the free end 14a of the margin 14, or in other words as far as the free end 18b of the second portion 18. In other words, the warp fibers (or longitudinal fibers 20L) of the second portion 18 are shorter than the warp fibers of the first portion 16; the warp fibers of the second portion 18 being set back from the free end 18b.

In this example, in order to weave the second portion 18, longitudinal 20L (warp fibers) of the main portion 12 are deviated and additional transverse fibers 20T2 (weft fibers) are inserted. These transverse fibers 20T2 constitute floats; consequently, introducing these additional transverse fibers 20T2 amounts to adding floats. Naturally, the deviated longitudinal fibers 20L are selected in the transverse direction T, e.g. one longitudinal fiber 20L for every three counted in the transverse direction L is deviated in order to form the weaving of the second portion 18, by adding transverse fibers 20T2.

In this embodiment, the longitudinal fibers 20L of the second portion 18 are, at least in part, common with a fraction of the longitudinal fibers 20L of the main portion 12. In a variant, these longitudinal fibers 20L of the second portion 18 are distinct from and independent of the fibers 20L of the second portion 12.

It should be observed that the fibers are shown very diagrammatically in order to clarify the description. The reader will nevertheless understand that, as a result of three-dimensional weaving, the longitudinal fibers 20L extend in reality both in the thickness direction E and in the longitudinal direction L. Similarly, the transverse fibers 20T and 20T2 extend in reality both in the thickness direction E and in the transverse direction T.

FIG. 2 shows the fibrous structure 10 of FIG. 1 after the margin 14 has been folded to the side of the second portion 18 in the direction of arrow A. The shoulder 18a is in contact with the outside face 12a of the main portion 12. When the fibrous structure 10 is embedded in a polymer in order to form a composite part, the first portion 16 forms a flange while the second portion 18 forms a counter-flange. In this example, the face 12*a* of the main portion is an outside face. Naturally, in a variant, the face 12*a* may be an inside face of the composite part. It should be observed that, because of the folded position of the margin 14, the longitudinal fibers 20L of the second portion 18 that are shortened in the warp direction extend to the free end 14*a* of the margin, or in other words to the free end 18*b* of the second portion 18.

FIG. 3 shows a second embodiment of a fibrous structure 10' similar to the fibrous structure 10 of the first embodiment. The only difference is that the first portion 16 is partially disjoint relative from the second portion 18. It should be observed that elements that are similar between the first and second embodiments are not described again and are given the same reference signs.

The boundary 22 lies in the plane P in the longitudinal and transverse directions L and T. This boundary 22 opens out into the free end 14*a* of the margin 14. The second portion 18 is connected to the first portion 16 beside the shoulder 18*a*, within the margin 14. This boundary 22 is obtained by non-interlinking during the weaving of the fibrous structure by keeping the warp fibers of the first portion 16 separate from the warp fibers of the second portion 18.

FIG. 4 shows the fiber support 10' of FIG. 3 after the margin 14 has been folded towards the side of the second portion 18 as represented by arrow A. The boundary 22 enables the second portion 18 to slide tangentially along arrow B away from the main portion 12 relative to the first portion 16. In this fibrous structure 10', the entire second portion 18 has slid tangentially relative to the first portion 16, so the longitudinal fibers 20L of the second portion 18 that have been shortened in the warp direction are not able to reach the free end 14*a* of the margin 14, as occurs when folding the margin 14 of the fibrous structure 10 in the first embodiment.

When the second portion 18 has slid relative to the first portion 16, the margin 14*a* having the free ends 16*a* and 18*b* of the first and second portions 16 and 18 is machined so that the free ends 16*a* and 18*b* lie in line with one another. In this example, the length of the second portion 18 that projects beyond the cutting plane C defined by the free end 16*a* of the first portion 16 is cut away. It should be observed that in a variant, this machining may be performed after the composite part has been fabricated, i.e. once the fibrous structure 10' has been embedded in a polymer matrix.

FIG. 5 shows a composite part 24 in fragmentary cross-section, made using the fibrous structure 10. Naturally, in a variant, this part 24 could be fabricated from the fibrous structure 10'.

In the part 24, the fibrous structure 10 is embedded in a polymer matrix 26. The first portion 16 and the second portion 18 are symbolically separated by a dashed line. Naturally, regardless of whether the part 24 is made from the fibrous structure 10 or 10', the first portion 16 and the second portion 18 are both embedded in the matrix 26 and form a single entity (i.e. a single block). Thus, in the part 24, the portion 16 forms a flange 28 while the second portion 18 forms a counter-flange 30. In the part 24, the main portion 12 forms the body 32 of the part 24.

FIG. 5 also shows, in dashed lines, a bolt 34 and a support 36 to which the part 24 is fastened. The flange 28 is arranged beside the support 36 while the counter-flange 30 is arranged beside the head 34*a* of the bolt 34. Thus, the counter-flange 30 takes up the local forces generated by the head 34*a* of the bolt 34 and distributes them over all of the flange 28. It should be observed that the weaving of the fibers as described with reference to FIGS. 1 to 4 serves advantageously to form a counter-flange 30 that withstands the local forces due to the counter-flange 30 co-operating with the head 34*a* of the bolt 34, thereby forming a flange 28 that holds the body 32 of the part 24 securely to the support 34.

In a variant, the first and second portions 16 and 18 present similar weaves, such that the flange and the counter-flange present an internal structure that is similar and symmetrical. Thus, the head of the bolt may be placed equally well beside the flange 28 or beside the counter-flange 30. In another variant, the weaving of the first and second portions 16 and 18 is inverted relative to the above description of the fibrous structures 10 and 10', such that the positions of the flange and of the counter-flange are interchanged relative to the positions shown in FIG. 5, thereby enabling assembly to be inverted compared with that shown in FIG. 5, the support 36 being placed in the location of the head 34*a* of the bolt 34, and vice versa.

FIG. 6 shows a guide vane 40 made out of a fibrous structure similar to the fibrous structure 10 or 10'. The shaded section in the material represents the section of FIG. 5. The vane 40 extends in an axial direction X. The vane root 42 presents an assembly of a flange 28 and a counter-flange 30 as described above with reference to FIG. 5. Naturally, in another variant, the vane also presents, in the vicinity of the vane head 44, an assembly of a flange and a counter-flange similar to that at the vane root 42.

FIG. 7 shows a ferrule 50 extending in an axial direction X and made using a fibrous structure similar to the fibrous structure 10 or 10'. The shaded section in the material represents the section of FIG. 5. The axial end 52 of the ferrule 50 presents an assembly comprising a flange 28 and a counter-flange 30, as described above with reference to FIG. 5. Naturally, in a variant, the ferrule 50 also presents, in the vicinity of its second axial end 54, an assembly of a flange and a counter-flange similar to that at the first axial end 52. The ferrule 50 constitutes a cylindrical part of circular section.

The invention claimed is:

1. A fibrous structure for fabricating a composite part including a matrix reinforced by the fibrous structure, the fibrous structure being made by three-dimensional weaving and presenting a main portion and a margin adjacent to the main portion;
   wherein in the fibrous structure the margin presents a thickness greater than a thickness of the main portion and the margin comprises a first portion arranged in continuity with the main portion and a second portion superposed on the first portion,
   wherein the margin is configured to be folded towards the second portion from an unfolded position wherein the margin extends the main portion to a folded position wherein the first and second portions respectively form a flange and a counter-flange for fastening the part.

2. The fibrous structure according to claim 1, wherein the margin presents a free end, the first portion being partially disjoint from the second portion beside the free end of the margin.

3. The fibrous structure according to claim 1, wherein a thickness of the first portion is different from a thickness of the second portion.

4. The fibrous structure according to claim 1, wherein the second portion presents warp fibers that are shorter than warp fibers of the first portion.

5. The fibrous structure according to claim 1, wherein the main portion extends in a longitudinal direction and in a transverse direction, the first portion extending in continuity with the main portion in the longitudinal direction, a majority of fibers of the first portion being oriented in the longitudinal direction, while a majority of fibers of the second portion are oriented in the transverse direction.

6. The method of fabricating a fibrous structure for fabricating a composite part including a matrix reinforced by the fibrous structure, wherein the fibrous structure is according to claim 1 and comprising weaving the fibrous structure by three-dimensional weaving.

7. The method of fabricating a fibrous structure according to claim 6, wherein floats are added during the weaving of the fibrous structure to make the second portion.

8. The method of fabricating a fibrous structure according to claim 6, comprising unlinking a fraction of the second portion from the first portion.

9. A method of fabricating a composite part including a matrix reinforced by a fibrous structure, the method comprising:
   providing the fibrous structure according to claim 1;
   folding the margin of the fibrous structure to form an assembly comprising a flange and a counter-flange for fastening the part; and
   densifying the fibrous structure with a polymer, the fibers of the fibrous structure being embedded in a matrix formed by the polymer.

10. The method of fabricating a composite part according to claim 9, wherein a free end of the margin is machined such that a free end of the first portion and a free end of the second portion lie in continuity one with the other.

11. A composite part comprising:
    a matrix reinforced by a fibrous structure, the fibrous structure being made by three-dimensional weaving and presenting a main portion and a margin adjacent to the main portion,
    wherein in the fibrous structure the margin presents a thickness greater than a thickness of the main portion and the margin comprises a first portion arranged in continuity with the main portion and a second portion superposed on the first portion, and
    wherein the margin is folded towards the second portion so that the first and second portions respectively form a fastener flange and a fastener counter-flange.

12. The composite part according to claim 11, forming a guide vane, the flange and the counter-flange being located in a vicinity of a root of the guide vane.

13. The composite part according to claim 11, forming a cylindrical part of circular section, the cylindrical part extending along an axial direction, the flange and the counter-flange being annular and being located in a vicinity of an axial end of the cylindrical part.

* * * * *